US005182542A

United States Patent [19]

[11] Patent Number: 5,182,542

Adelman et al.

[45] Date of Patent: Jan. 26, 1993

[54] SMOKE ALARM AND AIR CLEANING DEVICE

[75] Inventors: Roger Adelman, Cincinnati; Michael S. Duty, New Richmond, both of Ohio

[73] Assignee: Newtron Products Company, Cincinnati, Ohio

[21] Appl. No.: 724,872

[22] Filed: Jul. 2, 1991

[51] Int. Cl.[5] ........................ G08B 19/00; B01D 19/00

[52] U.S. Cl. .................................... 340/521; 340/628; 340/627; 340/607; 340/693; 340/586; 55/21; 55/213; 55/274

[58] Field of Search ............... 340/521, 628, 627, 693, 340/607, 586; 55/21, 213, 270, 274

[56] References Cited

U.S. PATENT DOCUMENTS

| | | | |
|---|---|---|---|
| 2,474,221 | 6/1949 | Cahusac . | |
| 3,447,152 | 5/1969 | Jensen | 340/521 |
| 3,885,162 | 5/1975 | Geertz . | |
| 4,088,986 | 5/1978 | Boucher | 340/521 |
| 4,115,082 | 9/1978 | Newell | 55/103 |
| 4,642,128 | 2/1987 | Solorzano | 340/607 |
| 4,656,832 | 4/1987 | Yukihisa et al. | 340/628 |
| 4,747,364 | 5/1988 | Horowitz | 55/274 |
| 4,751,501 | 6/1988 | Gut | 340/607 |

FOREIGN PATENT DOCUMENTS

| | | | |
|---|---|---|---|
| 0082396 | 3/1990 | Japan | 340/628 |
| WO90/10282 | 9/1990 | World Int. Prop. O. | 340/628 |

*Primary Examiner*—Donnie L. Crosland
*Attorney, Agent, or Firm*—Wood, Herron & Evans

[57] ABSTRACT

An air cleaner with a smoke alarm unit for a forced air recirculating system is disclosed. The smoke alarm unit is housed within a module that fits within the frame of the air cleaner with minimal impact on the cleaning ability of the cleaner. In a preferred embodiment of the invention, a battery capacity tester and air cleaner functionality detector are included in the module. Signals from the battery tester and functionality detector are used by the smoke alarm unit to drive an alarm generator with different signals to produce distinguishable alarms for a smoke condition, low battery condition, and an air cleaner failure. A control unit may receive any of the alarm conditions to execute different control actions in the forced air system.

29 Claims, 3 Drawing Sheets

SMOKE ALARM AND AIR CLEANING DEVICE

FIELD OF THE INVENTION

This invention relates to smoke detectors and air cleaning devices used in forced recirculating air conditioning systems.

BACKGROUND OF THE INVENTION

The use of smoke alarms in recirculating air conditioning systems is well known. The smoke alarms are normally mounted near or on the ceilings in various rooms serviced by the recirculating system or mounted adjacent to ducts within the system. When mounted in proximity to a duct, smoke alarms typically require an opening in the duct to sample the air or transmit some form of electromagnetic radiation through the air of the duct to detect smoke. While these types of smoke alarms are effective for generating alarms when smoke is detected in a room or duct, they usually require mountings, installation, and maintenance separate and distinct from the other components in the system.

For example, U.S. Pat. No. 3,369,346 shows a smoke alarm mounted in an auxiliary duct for a fiber carrying airstream. A portion of the fiber carrying airstream is diverted into the auxiliary duct so the smoke alarm can sense smoke in the diverted airstream. The smoke alarm of U.S. Pat. No. 2,474,221 uses reflected light to detect smoke within a duct. The smoke alarm of this '221 patent is mounted directly to the outside of one wall of the duct. An opening in the duct is required so a photoelectric sensor connected to the alarm can extend into the airflow. Light is injected into the duct through the opening by the alarm and the sensor detects reflected light from the particulate in the duct. The apparatus of U.S. Pat. No. 3,885,162 also uses optical techniques to detect smoke but does not include a sensor that extends into the airflow. Rather, a second opening is cut in the duct which opposes the light source of the alarm.

The operational components of the above described devices and other similar devices are mounted to the duct in a manner that facilitates their maintenance and keeps the components in a relatively clean operating environment. Environmental considerations for the electronics are important because temperature fluctuations created by the air flowing through the duct thermally stresses the electrical components and the suspended particulate in the air flow may disable certain types of sensors by blocking the flow of air through the sensor. These and other requirements have placed limitations on the development of devices for smoke detection in domestic and industrial buildings.

There is a continuing need for improvements in a forced recirculating air conditioning system that detects smoke in the air flow promptly and effectively.

SUMMARY OF THE INVENTION

In accordance with the principles of the present invention, an air cleaning and smoke alarm apparatus is provided for a forced recirculating air conditioning system. The apparatus is located in the system to intercept all recirculating air within the system to clean the air and detect smoke. Thus, in contrast to known devices of the types described in the above background, the inventive device promptly samples all the air recirculating in the system for smoke detection. The device also enables a smoke detector and alarm to be installed in a very convenient manner in association with an air cleaner without special mountings or adaptations of conventional systems. Considerable economies are involved in the application of the principles of this invention.

In one form of the invention, the air cleaning and smoke alarm apparatus is provided as an integral unit. To achieve this end, a housing for a smoke alarm frictionally fits within the frame of an air cleaner mounted in a duct of a forced air system. One advantage of this apparatus is that it may be installed in proximity to the blower in the system that is located at the center or heart of the system to intercept all of the recirculating air in the system at one location.

In another form, the air cleaning and smoke alarm apparatus has an air cleaner that may be serviced to renew its air cleaning ability. To accomplish this object, a triboelectric air cleaner is used for the air cleaning device. One advantage of using a triboelectric air cleaner is its increased air cleaning effectiveness over that of passive air filters, such as those using spun glass, without the energy costs associated with active air cleaners such as electrostatic air cleaners.

Another object of the present invention is to make the air cleaning and smoke alarm device free of any external electrical connections for its operation. To this end, the smoke alarm of the apparatus is powered by a battery which may be mounted within the smoke alarm housing.

The components of the apparatus may be monitored to detect their deterioration before complete failure. To achieve this end, an air cleaner functionality detector and a low battery detector are provided in the apparatus. The air cleaner functionality detector is mounted in proximity to the air cleaner to detect diminished air flow through the air cleaner. In a preferred embodiment of the invention, a pressure differential switch compares the difference in air pressures on the upstream and downstream sides of the air cleaner to a predetermined threshold to monitor the air cleaner. The low battery detector periodically tests the energy capacity of the battery to determine whether it retains sufficient energy to reliably operate the apparatus. Both the cleaner functionality and low battery detectors are connected to the alarm generator for the smoke to generate different alarms in response to either detected condition. One advantage of this device is the elimination of redundant alarm generators for each type of detector.

It is also an object of the present invention to control the recirculating air conditioning system with the air cleaner and smoke alarm device. To this end, the smoke detector generates a control signal that causes an action within the system, such as shutting off the blower or closing a ventilation opening when smoke is detected in the air flow. One advantage of this system is its ability to react to a fire situation by changing airflow conditions which may be contributing to the fire.

Other features, objects and advantages of the present invention shall be made apparent from the accompanying drawings and the following detailed description thereof.

BRIEF DESCRIPTION OF THE DRAWINGS

The accompanying drawings, which are incorporated and constitute a part of the specification, illustrate a preferred embodiment of the invention and, together with the general description given above, and the detailed description of the embodiment given below, serve to explain the principles of the invention.

DETAILED DESCRIPTION OF THE PREFERRED EMBODIMENT

Figure 1:
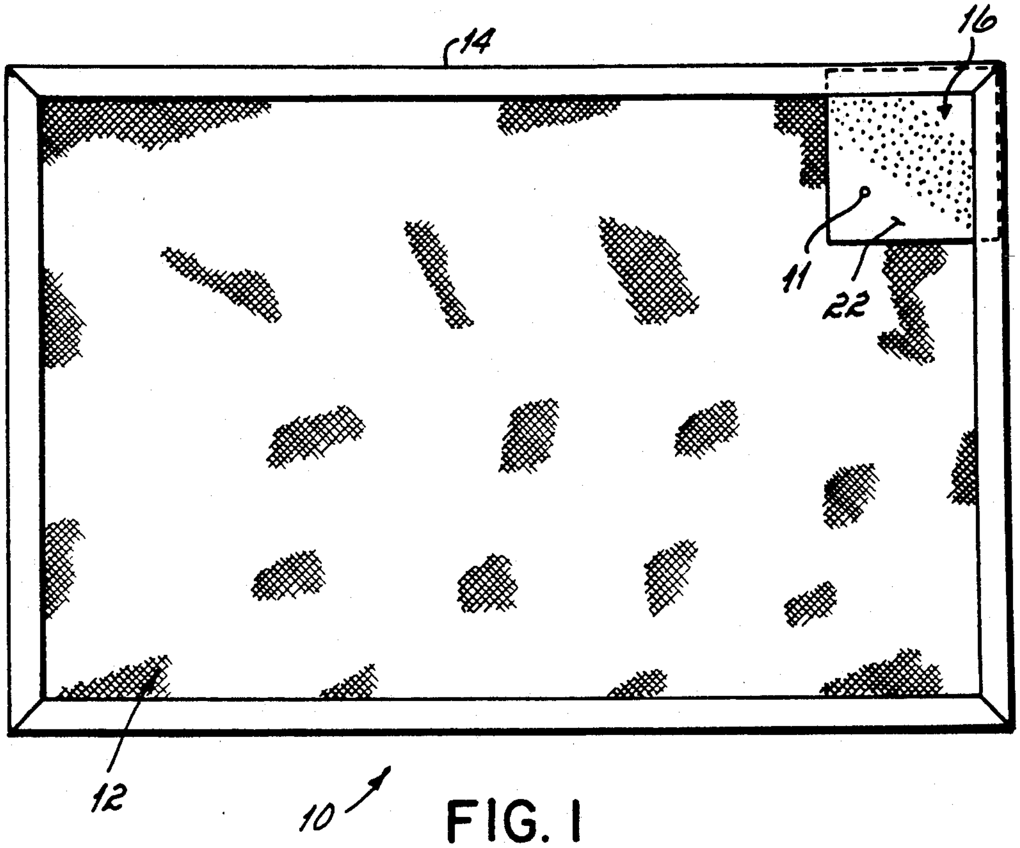
FIG. 1 is a plan view of a smoke detector and air cleaning apparatus built in accordance with the principles of the present invention.

A preferred embodiment of an air cleaner constructed in accordance with the principles of the present invention is shown in FIG. 1. Cleaner 10 includes an air cleaner 12 mounted within a frame 14 with a smoke alarm module 16 partially exposed in one corner thereof. A pressure opening 11 is located in cover plate 22 of module 16 that faces the airflow within the duct of a forced air recirculating system.

Figure 2:
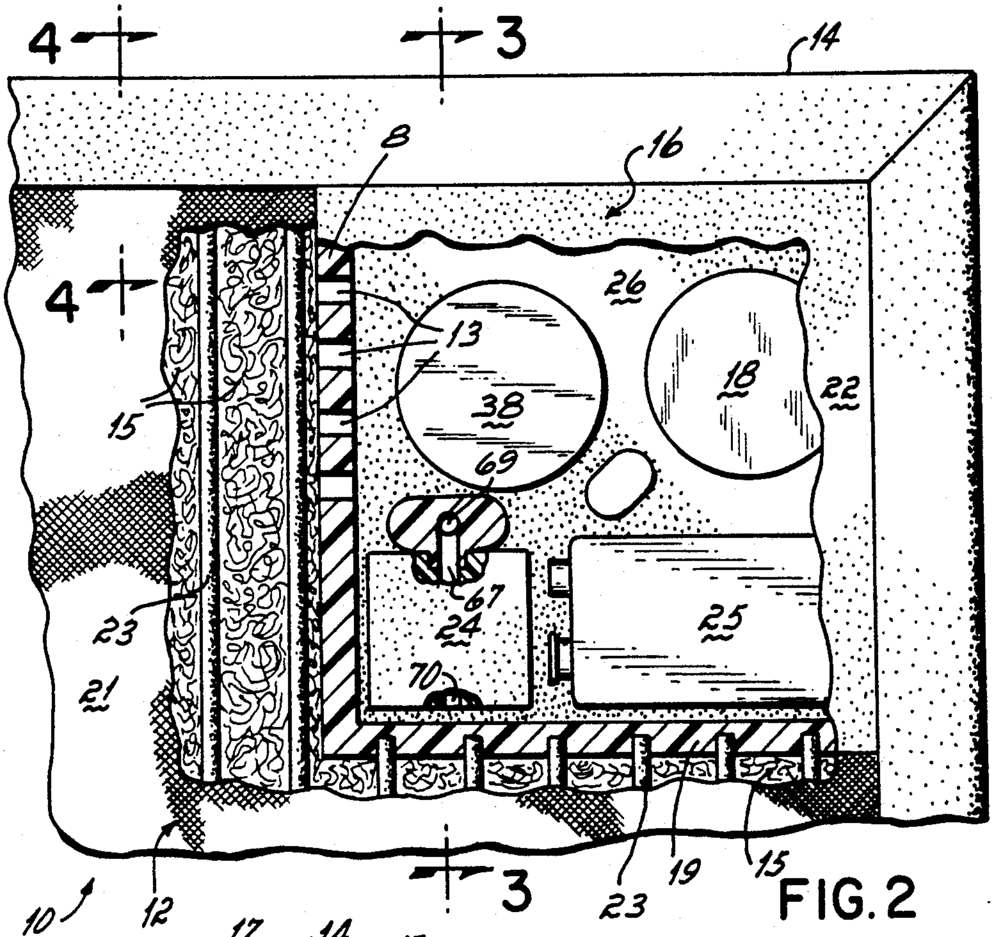
FIG. 2 is an enlarged fragmentary view, partially in cross-section, of the upper right hand corner of the apparatus shown in FIG. 1.

Module 16 is shown in FIG. 2 with cleaner 12 and cover 22 partially broken away to reveal smoke alarm unit 18, smoke sensor 38, battery 25, LED 126 and cleaner functionality detector 24. These components are mounted to mounting plate 26.

In the preferred embodiment of the present invention, air cleaner 12 is a triboelectric air cleaner such as that disclosed in U.S. Pat. No. 4,115,082 which is assigned to the assignee of the present application. The disclosure of that patent is hereby explicitly incorporated by reference in this application. Although cleaner 12 is preferably a triboelectric cleaner, other filters and cleaners may be used such as passive fiber filters or electrostatic cleaners. Cleaner 12 has a fibrous layer 21 that overlies cleaning media 15 and rods 23 that are inserted in bottom wall 19 of cover 22.

Ventilation openings 13 in side wall 8 of cover 22 permit air to flow from cleaner 12 into module 16, through smoke sensor 38, and exit via grille 61 (FIG. 3) in plate 26. Pressure intake 67 of functionality detector 24 intersects conduit 69 leading from pressure opening 11 in cover 22 to provide the intake sample. Opening 11 is sealed with a grommet or the like to prevent air from entering module 16 through the opening. Reference pressure intake 70 is open to sample the pressure within module 16. The relative air tightness of module 16 permits functionality detector 24 to sample the air impinging on the upstream side of cleaner 12 and the air in module 12 that has passed through cleaner 12. The relative difference between these two samples is indicative of the functionality level of cleaner 12. This is done without blocking the air through sensor 38 that permits it to detect smoke in the duct.

In the preferred embodiment of the invention represented in FIG. 2, functionality detector 24 is a pressure differential switch which samples the air pressure on the upstream and downstream side of cleaner 12. Switch 24 generates a signal when the pressure difference between the upstream and downstream side of cleaner 12 exceeds a predetermined threshold. The switch can be selectively set at different predetermined thresholds so the cleaner can be configured for use in different systems. Such switches are well known within the art. The signal from switch 24 activates a cleaner functionality alarm generating circuit. While the preferred functionality detector is a pressure differential switch, other devices that measure a property of the air that differs on either side of cleaner 12 because of the action of cleaner may be used. For example, a device that measures the amount of particulate remaining in the air after passing through the cleaner may be used.

Figure 3:
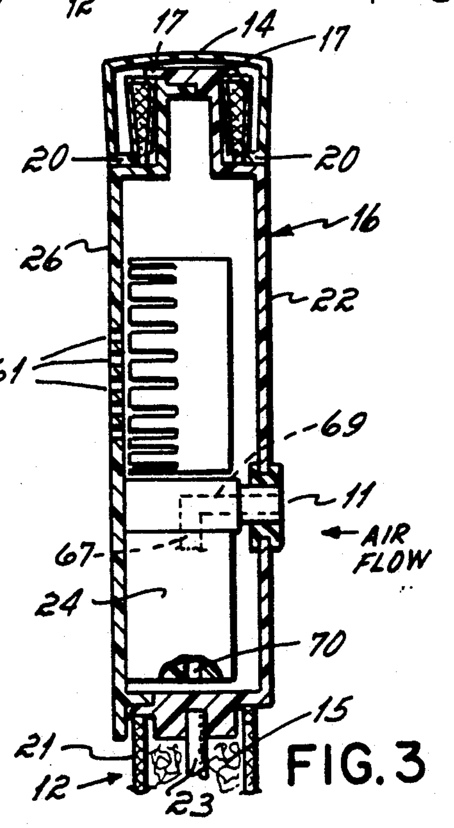
FIG. 3 is a cross-sectional view taken on line 3—3 of FIG. 2.
Figure 4:
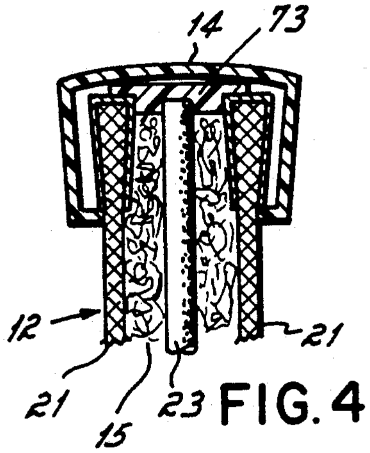
FIG. 4 is a cross-sectional view taken on line 4—4 of FIG. 2.

As shown in FIG. 3, mounting plate 26 snaps within cover 22 so plate 26 and the mounted components may be removed from device 10 so cleaner 12 can be cleaned. Mounting flange 17 formed by cover 22 and plate 26 is captured between channels 71, which hold the front and rear fibrous layers 21 of cleaner 12, and flanges 20 of frame 14. FIG. 4 shows the construction of cleaner 12 in the area outside module 16. Channels 71 are clamped over a fibrous layer and placed on either side of cleaning media 15. Rods 23 are secured within member 73 and extend downwardly through media 15.

The apparatus constructed in accordance with the principles of the present invention minimizes the area of the air cleaner affected by the installation of module 16 so the operational life of the cleaner is virtually unaltered. This is accomplished by reducing the size of module 16 that extends beyond frame 14 so it constitutes a negligible portion of the surface area of the media used in cleaner 12. In the preferred embodiment of the invention, the surface area of media 12 is approximately 400 square inches and the surface area of module 16 is approximately 12 square inches.

The housing of module 16 is also ventilated with openings 13 and grille 61 that permit the flow of air through the module. The section of cleaner 12 adjacent openings 13 clean the flow of air through module 16 that aids in dissipating heat from the electronic components and that provides the smoke sensor with air to sample for smoke particulate. Thus, the operating environment within module 16 is not destructive to the components and the air cleaner efficiency is relatively unaffected.

The components of smoke alarm module 16 are integrated with the cleaning function of cleaner 12 to make device 10 a cohesively functional unit. Cleaner 12 provides an airflow through module 16 that reduces the harshness of the duct environment to electronics and smoke sensors. The effectiveness of the cleaner is monitored by functionality detector 24 that detects the functional degradation of the cleaner before the environment within module 16 is adversely affected. Smoke alarm unit 18 periodically tests battery 25 by connecting LED 126 as a test load and determines the battery capacity. Smoke alarm unit 18 also provides an alarm actuator that generates an alarm for service personnel when cleaner 12 or the power source for module 16 are failing functionally.

As shown by FIGS. 1, 2 and 3, module 16 does not alter the dimensions of the air cleaner used in device 10. Thus, the device may be slid into and removed from a filter mounting slot in a typical duct of a forced recirculating air conditioning system. The mounting of module 16 within cleaner 12 and frame 14 eliminates the need for special access openings and external mounting structures.

Figure 5:
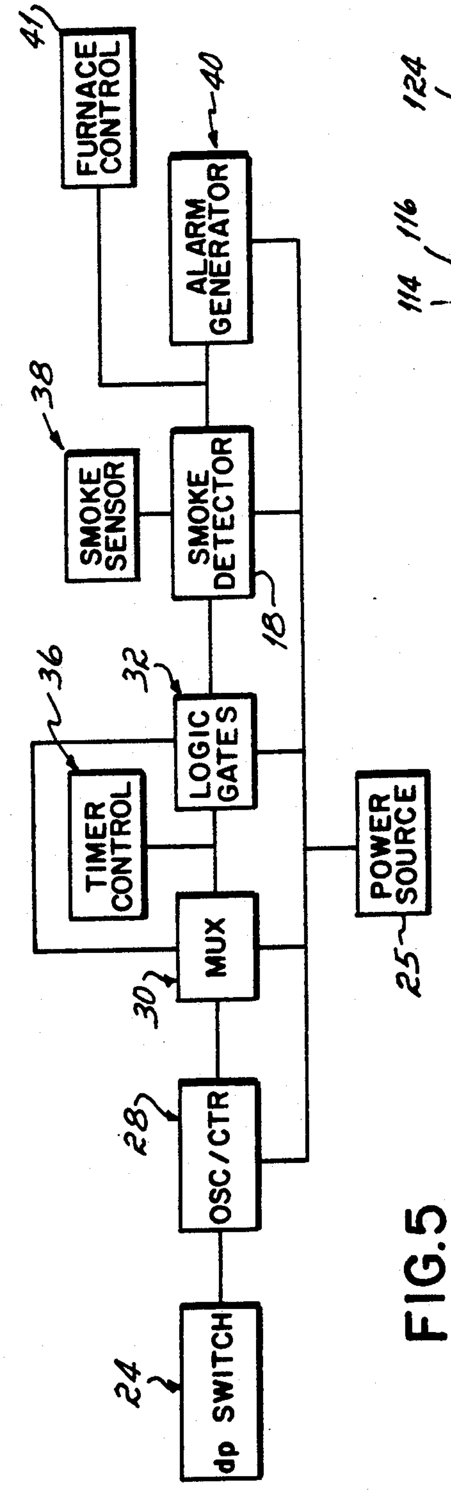
FIG. 5 is a block diagram depiction of the electronic circuitry in the invention.

A block diagram of smoke alarm module 16 is shown in FIG. 5. The electronic components of the smoke alarm module are powered by a power source 25, which in the preferred embodiment of the invention is a 9 volt dry cell battery. Functionality detector 24 along with the cleaner functionality alarm generating circuit components — counter 28, multiplexer 30, logic gates 32, and timer control 36 — provide a signal to smoke alarm unit 18 which indicates the functionality of the air cleaner has fallen below a predetermined threshold. Smoke alarm unit 18 drives alarm generator 40 in response to a signal from the cleaner functionality alarm generating circuit, a smoke detected signal from sensor 38, and a low battery signal. In the preferred embodiment of the invention, the alarm generator driving signal varies the alarm generated from each signal.

Functionality detector 24 generates a signal when the effectiveness of cleaner 12 falls below a predetermined threshold. The signal activates oscillator/counter 28, which internally generates a timing signal which is counted by a binary counter within the integrated circuit. Binary digits from the counter output are provided to multiplexer 30 which selects predetermined digits of the counter output to pass to logic circuit 32. Logic circuit 32 sends a cleaner failure signal to smoke detector 18 in accordance with the digits passed by multiplexer 30. Logic circuit 32 also sends control signals back to multiplexer 30 which select the binary digits of the counter output that are passed through multiplexer 30. The timing duration of the cleaner failure signal to smoke alarm unit 18 is determined by timer control 36. The repetition rate of the cleaner failure signal is determined by the binary counter digits passed through multiplexer 30.

Smoke alarm unit 18 performs three functions — smoke detecting, battery capacity testing, and alarm driving. Smoke alarm unit 18 detects smoke particulate in the air flow through sensor 38 of module 16. Power from source 25 is periodically monitored within smoke alarm unit 18 to determine if the capacity of source 25 has fallen below a predetermined level. When smoke is detected or the battery capacity falls below the predetermined level, smoke unit 18 drives alarm generator 40 with a driving signal to generate an audible alarm or report. Unit 18 produces one driving signal when smoke is detected and a second driving signal when the battery is low so the alarms generated from the two driving signals are distinguishable from one another.

The cleaner failure signal from logic circuit 32 has its frequency and duration altered by timer control 36 and the timing digits passed by multiplexer 30. The cleaner failure signal modifies the reference voltage that unit 18 uses to detect a smoke condition from sensor 38. Altering the reference voltage causes unit 18 to generate a smoke alarm driving signal but the duration and repetition of the cleaner failure signal controls the duration and repetition of the generated alarm. Thus, the resulting alarm or report is distinguishable from both the smoke alarm and low battery alarm. By driving alarm generator 40 with different signals, the service personnel can distinguish between a smoke alarm, low battery alarm, and a cleaner functionality failure alarm.

In the preferred embodiment of the present invention, smoke alarm unit 18 is a Jameson Code One-2000 Model C manufactured by Jameson Home Products of Downers Grove, Ill. The unit uses a Motorola 14467-1 integrated circuit manufactured by Motorola, Inc. of Phoenix, Ariz. The smoke alarm unit of the preferred embodiment uses an ionization sensor to detect smoke in the air flow of the duct. Other smoke alarm units may be used that utilize other smoke detection methods such as optical sensors or the like.

The integration of the functionality alarm with the smoke alarm made possible by varying the alarm driving signal from unit 18, contributes to the downsizing of module 16 since redundant alarm generators are eliminated. The reduced package size eliminates false smoke alarms caused by the accelerated deterioration of the cleaning media. Blockage of a large area increases the cleaning requirements for the unblocked portion of the cleaner and decreases the operational life of the media. Without more frequent servicing, the air is not cleaned as well and the amount of particulate remaining in the air increases. This increased particulate may be sensed as smoke by the detector which erroneously generates a smoke alarm. These false alarms are virtually eliminated by the minimal impact module 16 has on the area of cleaner 12 and by cleaner maintenance performed in response to the cleaner functionality alarms generated by the present invention.

Furnace control 41 of FIG. 5 operates elements of the furnace in the forced air system using the cleaning device of the present invention. These control operations may be performed by control 41 in response to the wiring of the alarm driving signal to control 41, the detection of an acoustical signal generated by alarm generator 40, or the transmission of an alarm signal by a radio transmitter or the like connected to the alarm driving signal. Control 41 may include a computer operated control system or a simple relay that is energized by the signal. Control 41 may close ventilation openings, shut off the blower, divert airflow through different ducts or other system related actions.

Figure 7:
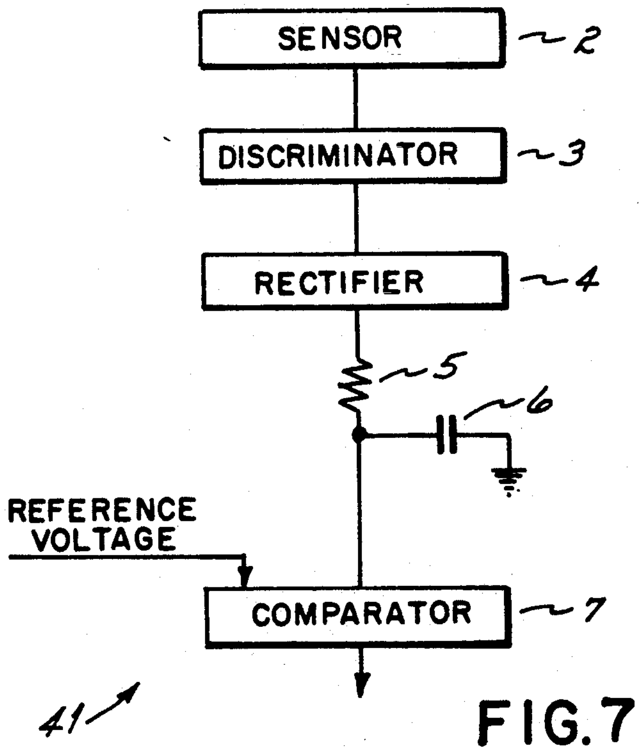
FIG. 7 is a block diagram of a control signal generator.

A block diagram of a preferred furnace control signal generator is shown in FIG. 7. A sensor 2 detects a signal such as, the alarm driving signal, an acoustic alarm, radio signal or the like. A discriminator 3 verifies that the signal is indicative of a condition detected by device 10 that requires a control action. A plurality of discriminators may be used to distinguish the different types of alarms from one another and execute different control actions for each type of alarm. The discriminated signal is rectified by full wave rectifier 4 and fed by resistor 5, capacitor 6 combination to a comparator 7. The resistor-capacitor combination requires the received signal to be present for at least one charging time constant to prevent control actions from transient signals. Comparator 7 compares the signal to a reference voltage and generates a control signal when it is greater than the reference voltage. The control signal may then be used to close a relay, interrupt a control processor, or the like. For example, the control signal could energize a relay to open or close an input power connection to an output power connection.

Figure 6:
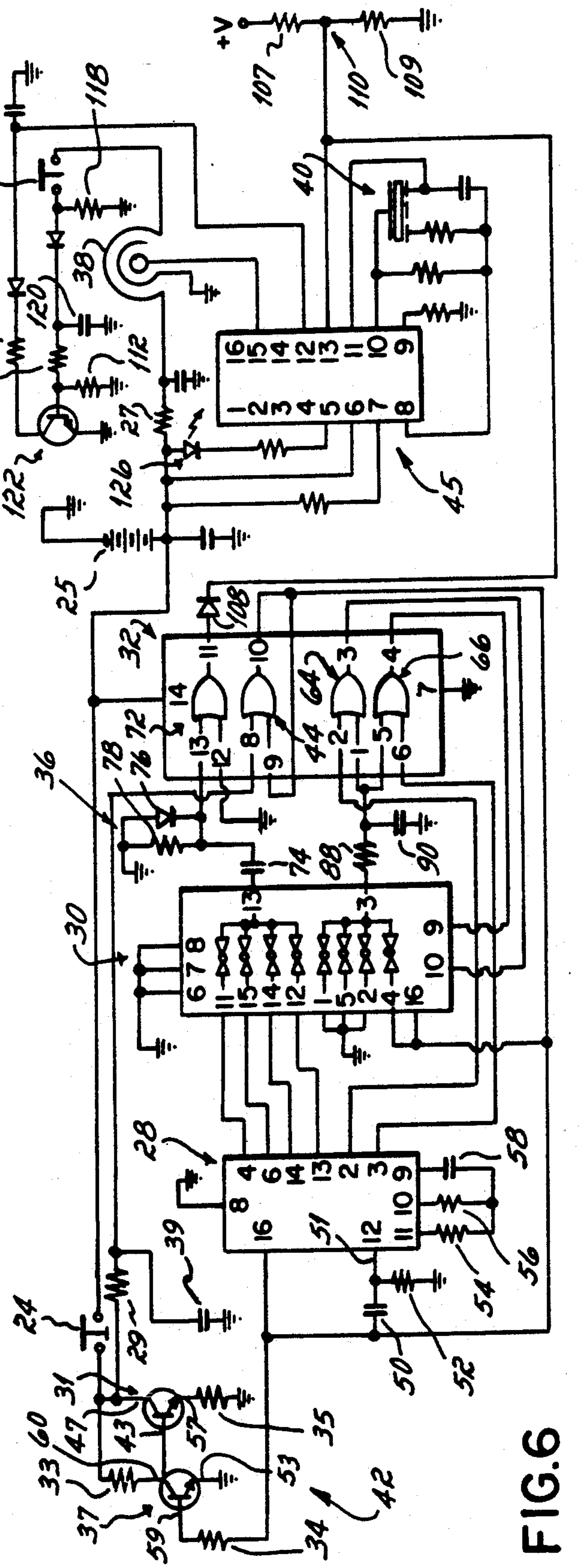
FIG. 6 is an electrical schematic diagram of the components used in the preferred embodiment of the present invention.

A schematic diagram of the electrical components in the preferred embodiment of the present invention is shown in FIG. 6. Battery 25 is connected to input power pin 6 of smoke alarm integrated circuit (IC) 45; to pressure differential switch 24; logic gates 32; and to sensor 38 via resistor 27. Switch 24 selectively connects power through resistor 33 to collector 47 and base 43 of transistor 31. Collector 47 is connected through resistor 29 to input pin 8 of logic gate 44. Resistor 29 and capacitor 39, connected between the low potential side of resistor 29 and ground, absorb any signals from switch 24 caused by transient closings. The output of gate 44 is provided to input pin 9 to latch the closed switch signal through the gate. This signal provides counter 28 and multiplexer 30 with electrical power. Capacitor 50 and resistor 52 are connected to the output of gate 44 to provide a delayed reset pulse to reset input 51 of counter 28.

The output of gate 44 is also tied to base 59 of transistor 37 through resistor 34. Transistor 37 has its emitter 53 grounded and its collector 60 tied to the low potential of resistor 33. The output of gate 44 turns on transistor 37 to remove the voltage on the base of transistor 31 that turns off transistor 31. The current drain on battery 25 is much lower through transistor 37 than transistor 31 since resistor 33 is several orders of magnitude greater than resistor 35. In the preferred embodiment of the invention, resistor 33 is 1 megohm and resistor 35 is 100 ohms, although other values may be used.

In the preferred embodiment of the present invention, counter/oscillator 28 is a CD14060 manufactured by Motorola of Phoenix, Ariz., although other similar devices could be used. Resistors 54, 56 and capacitor 58 are connected to counter 28 to control the frequency of the timing signal generated by the internal oscillator of counter 28. Output pins 4, 6, 14 and 13 of the counter which count the timing signal within counter 28 are connected to input pins 11, 15, 14 and 12, respectively, of multiplexer 30. Output pins 2 and 3 of the counter are connected to input pins 2 and 6, respectively, of OR gates 64 and 66, respectively, of the quad OR gate logic circuit 32. In the preferred embodiment of the present invention, multiplexer 30 is a CD14052 and logic circuit 32 is a CD14071, both produced by Motorola of Phoenix, Ariz. The three components 28, 30 and 32 are all CMOS devices in the preferred embodiment of the present invention to take advantage of the low power consumption of such devices and to provide logical compatibility with the CMOS smoke alarm IC in the preferred embodiment.

Multiplexer 30 has two 4 to 1 channels with input pins 1, 5, and 2 of the second channel connected to ground and pins 4 and 16 are connected to output pin 10 of logic gate 44. Input pins 11, 12, 14, and 15 of the first channel are tied to the output of counter 28 as disclosed above. Output 13 of the first channel is connected to input pin 13 of OR gate 72 through capacitor 74 of timer control 36. Diode 76 and resistor 78 ground the line between capacitor 74 and input pin 13. Output pin 3 of the second multiplexer channel is connected to input pins 1 and 5 of gates 64, 66, respectively, through resistor 88. Capacitor 90 connects the line between resistor 88 and gate input pins 1 and 5 to ground. Gate input pin 12 is tied to ground to improve electrical noise immunity.

Output pins 3 and 4 of gates 64, 66 are tied to the input channel select pins 10 and 9 of multiplexer 30 to control the input channel selection as explained below. Output pin 11 of gate 72 is connected via diode 108 to voltage divider 110 which provides the smoke reference voltage to alarm IC 45. The remaining components connected to alarm IC 45 interface the alarm IC to alarm generator 40 and smoke sensor 38. The circuit comprised of resistors 112, 114, 116 and 118, capacitor 120, transistor 122, and momentary switch 124 is for manually testing the smoke detector. Likewise, LED 126 is connected to alarm IC 45 to provide a test load for battery 25 and a visual indication that alarm IC 45 is periodically performing the battery test.

The electronics are powered by battery 25 which drives smoke alarm IC 45 and logic gates 32 directly and provides the operational power for counter 28 and multiplexer 30 through gate 44. As previously discussed, switch 24 closes when the pressure difference monitored by the switch exceeds the predetermined threshold to provide an activating current to base 43 of transistor 31 through resistor 33. Switch 24 also provides a voltage on collector 47. Since the voltage at base 43 is dropped across resistor 33 and emitter 57 is tied to ground through the relatively low resistance of resistor 35, the base to emitter voltage is forward biased and the base to collector is reverse biased causing transistor 31 to conduct current from the collector to the emitter. Resistor 35 is sized sufficiently small to pull a large enough current through the contacts of switch 24 to burn through any oxidation that may accumulate on the contacts. In the preferred embodiment of the present invention, the current pulled through the switch contacts is 10 ma.

Part of the current at collector 47 charges capacitor 39 through resistor 29. When capacitor 39 is sufficiently charged, input pin 8 of OR gate 44 goes high and output 10 is driven high. The output of gate 44 is fed to input pin 9 to latch the switch signal. Output 10 now remains high and supplies power to counter/oscillator 28 and multiplexer 30. Resistor 29 and capacitor 39 require the signal from switch 24 to be present for at least one charging period of capacitor 39 through resistor 29. In the preferred embodiment of the invention, the minimum time period is 6.8 seconds. If the pressure differential drops below the threshold before capacitor 39 is charged, input pin 8 does not go high and turn on output pin 10 of gate 44 to power components 28 and 30. The resistor, capacitor combination prevents false alarms from transient blockage of switch 24.

Once output 10 is high, a voltage is dropped across resistor 34 to base 59 of transistor 37 causing transistor 37 to conduct the voltage dropped across resistor 33 at collector 60 to the ground connection at emitter 53. This conduction removes the base current from base 43 and transistor 31 turns off. Current is now conducted through the relatively high resistance of resistor 33 to the ground connection at emitter 53 and the current through switch 24 drops to a level substantially less than the initial current drawn by transistor 37. The reduction in current through switch 24 preserves the capacity of battery 25 and increases its operational life.

The battery power is also supplied to the reset 51 on counter 28 through capacitor 50. When power is first applied to capacitor 50, it acts as an electrical short and the battery voltage is present on reset 51. As capacitor 50 accumulates charge, the voltage on reset 51 drops to a logic low. The high to low transition on reset 51 resets counter 28. The RC time constant of resistor 52 and capacitor 50 is such that counter 28 resets after the other components have settled to their initial state after power up.

Once counter 28 is powered on and its internal oscillator begins to operate, the timing of the oscillator is determined by external resistors 54, resistor 56 and capacitor 58. In the preferred embodiment, these components are selected to produce an internal signal of 112.5 seconds. The internal counter of counter/oscillator 28 counts the generated timing signal to produce a binary output count, $Q_1$–$Q_{14}$, with $Q_1$ being the least significant binary digit. In the preferred embodiment of the present invention, $Q_6$, $Q_7$, $Q_8$ and $Q_9$ are provided on output pins 4, 6, 14 and 13 of counter 28 and represent, respectively, the one hour, two hour, four hour, and eight hour timing counts. These four lines are input to the first channel of multiplexer 30 which selects one of the four lines according to the status of control input pins 10 and 9.

Following power-up, output pins 3 and 4 of gates 64, 66 are logically low and channels one and two of multiplexer 30 pass the inputs on pins 12 and 1, respectively, to the channel outputs. Since pin 12 is connected to output pin 13, output pin 13 of channel one is a logic low for the first 8 hours following switch 24 closure and then is a logic high for the next 8 hours. When output pin 13 first goes high, capacitor 74 acts as an electrical short and the logic high of output pin 13 drives output pin 11 of gate 72 high. As capacitor 74 charges, the voltage at input pin 13 drops until it falls below the threshold of gate 72 and output pin 11 falls to a logic low. The values of resistor 78 and capacitor 74 determine the time it takes capacitor 74 to charge and thus the period that output pin 11 of gate 72 remains high. In the preferred embodiment of the present invention, this timing period is approximately 2.5 seconds.

During this period, the voltage from output pin 11 is presented to the reference voltage input of alarm IC 45. This voltage raises the reference voltage to a value that is very nearly the voltage that alarm IC 45 receives from sensor 38. These voltages are close enough that the voltage comparator within alarm IC 45 generates an alarm signal to drive alarm generator 40 for the pulse period. Once output pin 11 of gate 72 drops, the reference voltage returns to the voltage present between resistor 107, 109 of voltage divider 110 which is substantially less than the voltage from sensor 38 when no smoke is present. Unless smoke has altered the voltage output by sensor 38, the voltage comparator of alarm IC 45 no longer generates the alarm signal.

After counter 28 has counted another 8 hours, output pin 13 of multiplexer 30 follows output pin 13 of counter 28 and drops low. This causes capacitor 74 to discharge through resistor 78 which presents a pulse to input pin 13 of gate 72. This pulse again causes alarm IC 45 to drive alarm generator 40 for the duration of the period to produce an alarm. Thus, an alarm is produced by generator 40 every 8 hours. This periodic alarm continues until output pin 2 of counter 28 goes high. As pin 2 goes high so does input pin 2 of gate 64 which drives its output pin 3 and channel select pin 10 high. This causes multiplexer 30 to select channel input pins 14 and 5 for channels 1 and 2, respectively. Since pin 5 is grounded, the outputs of gates 64, 66 remain unaffected and the channel select lines remain the same. The change of channel 1 input to pin 14 causes output pin 13 to follow counter output pin 14 which has a frequency one-half that of counter pin 13. This causes alarm generator 40 to alarm for the duration of the pulse from output pin 11 of gate 72 every 4 hours. The doubling of the alarm frequency indicates that the cleaner 12 continues to deteriorate and provides an increased urgency for its remedial maintenance.

The 4 hour periodic alarms continue for another 128 hours until counter output pin 2 goes low and counter pin 3 goes high. This transition occurs as counter 28 continues to count the internal timing signal. Pin 2 dropping low causes output pin 3 of gate 64 to drop low and pin 3 going high causes output pin 4 of gate 66 to go high. This change on channel select pins 10, 9 moves the input channel select for channel 1 to pin 15 and for channel 2 to pin 2. Because multiplexer pin 2 is grounded, channel select pins 10, 9 are unaffected. Connecting input pin 15 to channel 1 output pin 13 makes pin 13 follow output pin 6 of counter 28 which is one half the frequency of pin 14. Smoke alarm IC 45, consequently, drives alarm generator 40 every two hours to further provide a more urgent indicator that cleaner 12 needs servicing.

At the conclusion of another 128 hour period, pin 2 of counter 28 goes high. With both pin 2 and 3 high, gates 64, 66 both produce logic highs on output pins 3 and 4 to drive channel select pins 10, 9 high. Channels 1 and 2 now pass pins 11 and 4 respectively. Pin 4 is tied to the supply voltage and is shunted to ground through resistor 88 at first because capacitor 90 acts as an electrical short. After capacitor 90 charges, the battery voltage remains at input pins 1 and 5 of gates 64, 66 to keep output pins 3 and 4 high. This remains true even though counter output pins 2 and 3 go to a logic low at the end of the next 128 hour period causing gate input pins 1 and 5 to go low. However, gate output pins 3 and 4 remain high because input pins 1 and 5 are held high by output pin 3 on the output of channel 2. Thus, channels 1 and 2 remain connected to input pins 11 and 4. Pin 11 is connected to counter output pin 4 which has a frequency one-half of pin 6. The appearance output of pin 4 on the channel 1 output causes alarm generator 40 to alarm for the duration of the pulse every hour. Because channel one remains connected to pin 4 of counter 28, the 1 hour periodic alarms continue indefinitely. After servicing cleaner 12, the counting circuit may be reset by disconnecting and reconnecting the battery.

While the present invention has been illustrated by the description of the preferred embodiment and while the preferred embodiment has been described in considerable detail, it is not the intention of the applicant to restrict or any way limit the scope of the appended claims to such detail. Additional advantages and modifications will readily appear to those skilled in the art. The invention in its broader aspects is therefore not limited to the specific details, representative apparatus, and illustrative examples shown and described. Accordingly, departures may be made from such details without departing from the scope or spirit of applicant's general inventive concept.

What is claimed is:

1. A smoke alarm and air cleaning device for use in a forced recirculating air conditioning system having a blower comprising:

means for cleaning the air, means for generating an alarm in response to smoke in the air, and means for integrating said air cleaning means with said alarm generating means so that both said means for cleaning the air and generating the alarm intercept recirculating air within the system for cleaning the air and smoke detection.

2. The device of claim 1 wherein both said means are mounted in a housing for installation in proximity to the system blower.

3. The device of claim 1 wherein said cleaning means is removable from said system to renew its cleaning ability for reuse.

4. The device of claim 3 wherein said cleaning means is a triboelectric air cleaning device.

5. The device of claim 1 wherein said cleaning means is a disposable passive air filter.

6. The device of claim 2 wherein said alarm generating means is separable from said housing.

7. The device of claim 1 further comprising a battery mounted within said housing and electrically connected to said smoke alarm means to electrically power said smoke alarm means.

8. The device of claim 7 further comprising means for detecting and reporting a low battery condition when the electrical energy capacity of said battery falls below a predetermined level.

9. The device of claim 8 further comprising means for detecting and reporting cleaning means failure when said cleaning means functionality falls below a predetermined threshold.

10. The device of claim 9 wherein the low energy capacity report, the air cleaning means failure report, and the smoke alarm are distinguishable from one another.

11. The device of claim 10 wherein the low energy capacity report, the air cleaning means failure report, and the smoke alarm substantially differ from one another in frequency.

12. The device of claim 11 further comprising means for transmitting one of the low energy capacity report, the air cleaning means failure report, and the smoke alarm to a remote location.

13. The device of claim 11 further comprising system control means for controlling the forced recirculating system in response to the low energy capacity report, the air cleaning means failure report, and the smoke alarm, the control means executing different controls for each of the distinguishable reports and alarm.

14. The device of claim 9 wherein said cleaning means failure detecting and reporting means responds to a pressure differential across said airflow cleaning means that exceeds a predetermined pressure threshold.

15. The device of claim 1 further comprising means for disabling air circulation in the system in response to the smoke alarm generated by said smoke alarm means.

16. The device of claim 1 further comprising output power connection, input power connection, and electrical power control means selectively electrically connecting said input connection to said output power connection in response to said smoke alarm means.

17. An air cleaner monitoring circuit for a forced air conditioning system in a building, the system having at least one blower and a duct connected to the blower to circulate air throughout the building, comprising means for cleaning the air in said system, means for generating an alarm in response to smoke in the circulating air, an electrical power source electrically connected to said smoke alarm means, means for detecting and reporting low electrical energy capacity when the electrical energy capacity of said electrical power source falls below a predetermined level, means for detecting and reporting cleaning means failure predetermined threshold; and means for integrating both said detecting and reporting means with one another in the forced air conditioning system.

18. The device of claim 17 further comprising a module housing in which said smoke alarm means, said detecting and reporting low electrical energy means, said energy source, and said detecting and reporting cleaning means failure means are housed to form a unit, said unit removably housed within the cleaning means for installation and removal with the air cleaning means.

19. The device of claim 17 wherein said detecting and reporting cleaning means failure means is electrically connected to said smoke alarm means so said smoke alarm means reports the low electrical energy capacity of said electrical power source in response to a cleaning means failure.

20. The device of claim 17 wherein the low energy capacity report from said low energy detecting and reporting means is distinguishable from the smoke alarm generated by said smoke alarm means.

21. The device of claim 18 wherein said detecting and reporting cleaning means failure means electrically alters a reference voltage input to said smoke alarm means.

22. The device of claim 17 wherein said module housing is sized to partially fit within a frame of the cleaning means so said unit minimally interferes with airflow through said cleaning means.

23. The device of claim 22 wherein said module housing is ventilated so that said smoke alarm means receives a continuous air sample from which it may detect smoke.

24. An air cleaner monitoring circuit for a forced air conditioning system in a building, the system having at least one blower and a duct connected to the blower to circulate air throughout the building, the duct having an air cleaning device amounted therein to clean the recirculating air, comprising means for generating an alarm in response to smoke in the circulating air, an electrical power source electrically connected to said smoke alarm means, means for detecting and reporting low electrical energy capacity when the electrical energy capacity of said electrical power source falls below a predetermined level, means for detecting and reporting cleaning means failure when the functionality falls below a predetermined threshold, and means for integrating both said detecting and reporting means in the forced air conditioning system.

25. The device of claim 24 further comprising a module housing in which said smoke alarm means, said detecting and reporting low electrical energy means, said energy source, and said detecting and reporting cleaning means failure means are housed to form a unit, said unit removably housed within the cleaning device for installation and removal with the air cleaning device.

26. The device of claim 2 wherein said detecting and reporting cleaning means failure means is electrically connected to said smoke alarm means so said smoke alarm means reports the low electrical energy capacity of said electrical power source in response to an air cleaning device failure.

27. The device of claim 26 wherein the low energy capacity report from said low energy detecting and reporting means is distinguishable from the smoke alarm generated by said smoke alarm means.

28. The device of claim 27 wherein said detecting and reporting cleaning means failure means electrically alters a reference voltage input to said smoke alarm means.

29. The device of claim 24 wherein said module housing is sized to partially fit within a frame of the cleaning means so said unit minimally interferes with airflow through said cleaning means.

* * * * *